(12) United States Patent
Delaforce

(10) Patent No.: US 6,296,231 B1
(45) Date of Patent: Oct. 2, 2001

(54) PIPE THREADING ARRANGEMENT

(75) Inventor: Stephen Robert Delaforce, Loughborough (GB)

(73) Assignee: Lattice Intellectual Property Ltd. (GB)

( * ) Notice: Subject to any disclaimer, the term of this patent is extended or adjusted under 35 U.S.C. 154(b) by 0 days.

(21) Appl. No.: 09/601,036

(22) PCT Filed: Jan. 19, 1999

(86) PCT No.: PCT/GB99/00168

§ 371 Date: Aug. 28, 2000

§ 102(e) Date: Aug. 28, 2000

(87) PCT Pub. No.: WO99/40661

PCT Pub. Date: Aug. 12, 1999

(30) Foreign Application Priority Data

Feb. 5, 1998 (GB) .................................................. 9802418

(51) Int. Cl.[7] .................................................. B65H 59/00

(52) U.S. Cl. .................................. 254/134.4; 254/134.3 R; 254/134.3 FT

(58) Field of Search ....................... 254/134.4, 134.3 FT, 254/134.3 R; 137/1, 3, 808

(56) References Cited

U.S. PATENT DOCUMENTS

| | | | |
|---|---|---|---|
| 5,121,644 | * 6/1992 | Grey et al. | 254/134.4 |
| 5,156,376 | * 10/1992 | Spicer | 254/134.4 |
| 5,246,207 | * 9/1993 | Horii et al. | 254/134.4 |
| 5,395,091 | * 3/1995 | Craddock | 254/134.4 |
| 5,906,357 | * 5/1999 | Munson, Sr. | 254/134.4 |

FOREIGN PATENT DOCUMENTS

| | | | |
|---|---|---|---|
| 31 40 928 | 5/1983 | (DE) . | |
| 0 294 243 | 12/1988 | (EP) . | |
| 0 442 626 | 8/1991 | (EP) . | |
| 0 736 722 | 10/1996 | (EP) . | |
| 2 228 777 | 9/1990 | (GB) . | |
| 2 312 995 | 11/1997 | (GB) . | |
| 4140007 | * 5/1992 | (JP) | 254/134.4 |

* cited by examiner

Primary Examiner—Derris H. Banks
Assistant Examiner—Daniel Shanley
(74) Attorney, Agent, or Firm—Larson & Taylor, PLC

(57) ABSTRACT

A pipe threading arrangement includes a launch body (13) and a parachute (15) within tube (12). The parachute is launched into pipe (2) via slide valve (1) and brings with it a threading cable (19). At a remote location within the pipe (2) the parachute is stopped by a catch arm (8) with associated catch finger (5). The parachute is deflated and retrieved, together with the threading cable, via the slide valve into the catch body (4).

12 Claims, 3 Drawing Sheets

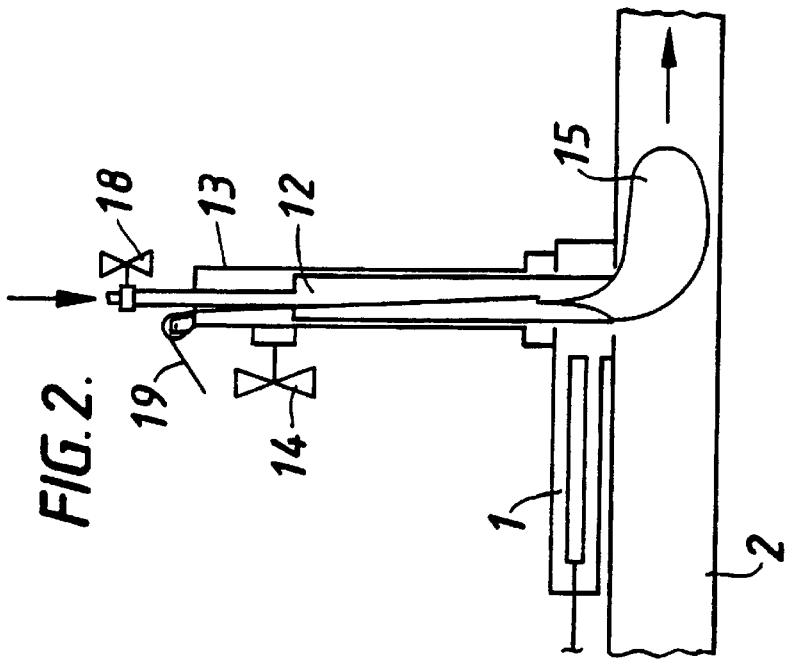
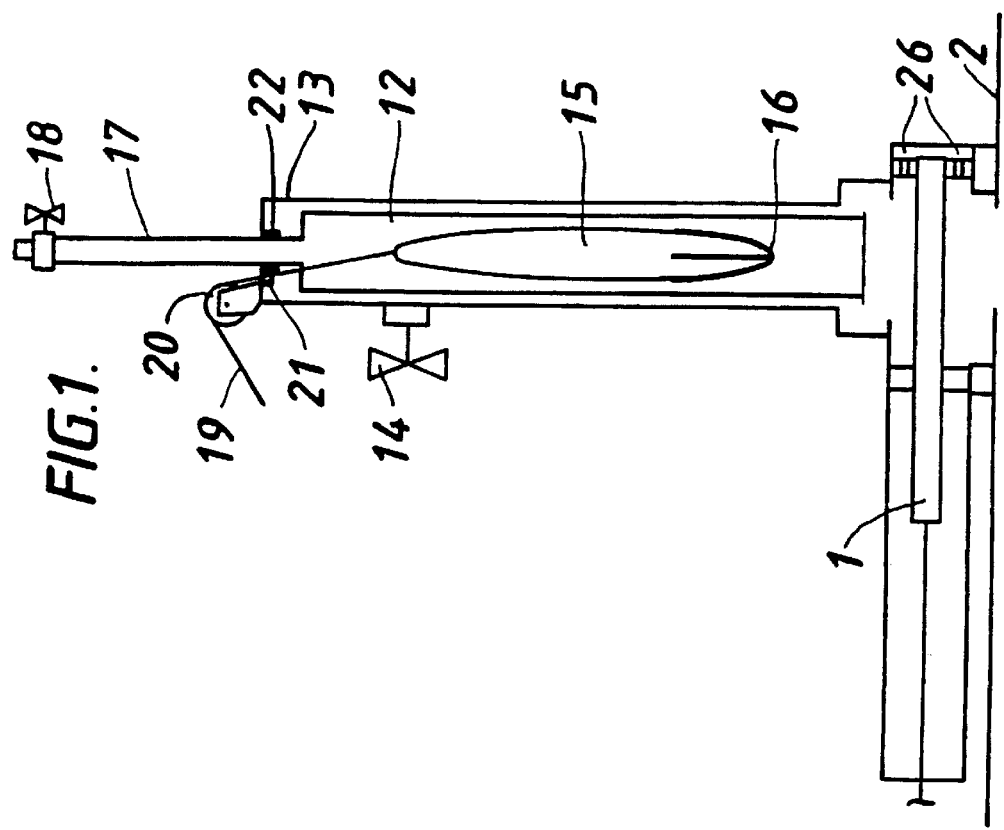

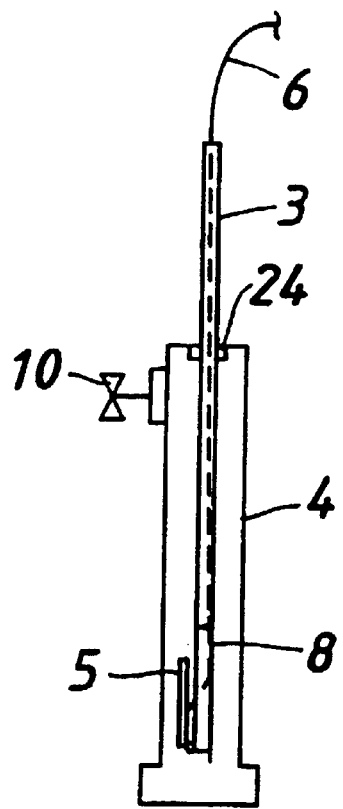
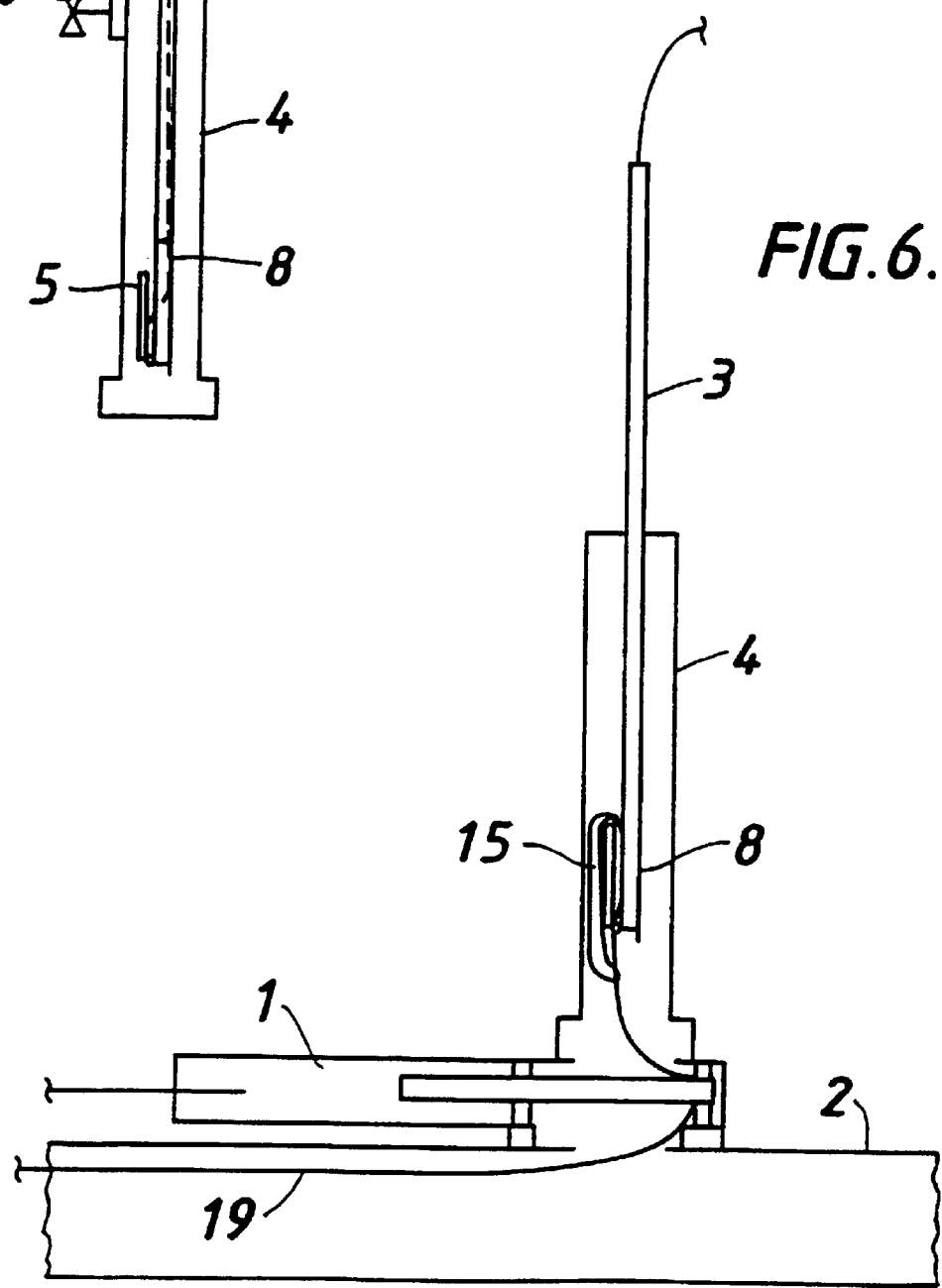
FIG.5.
FIG.6.

PIPE THREADING ARRANGEMENT

The invention relates to the threading of a pipe between two locations, the pipe typically carrying a fluid.

In gas pipes, for example, it may be necessary to allow an object to be towed between one location and another in a 'live' fluid carrying condition. Such a situation is described in copending patent application GB 9724231.7.

The present invention is concerned with a mechanism for allowing an initial lightweight thread or cable to be passed between the locations prior to towing the object between the two points.

According to the invention there is provided pipe threading apparatus including means for launching a parachute-like device from a first location through the pipe to a second location under fluid pressure and stopping means for positioning at the second location for stopping the further passage of the parachute-like device, the parachute-like device being configured to carry a cable so as to provide a connection between the first and second locations.

The stopping means preferably has an adherent surface for cooperating with an adherent surface carried by the parachute-like device.

Preferably the stopping means is moveable perpendicular to the axis of the pipe to automatically halt the parachute-like device on contact with the stopping means.

Further according to the invention there is provided a method of threading a pipe between first and second locations comprising providing an aperture in the pipe at first and second spaced locations, providing a stopping device within the pipe at the second location, launching a parachute-like device carrying a threading cable from the first location allowing the parachute to move to the second location by means of fluid flow through the pipe until stopped by the stopping device and retrieving the parachute-like device with the attached cable to provide pipe threading between the first and second locations.

Preferably the method includes providing sealable chambers at the first and second locations to allow the device to be launched and retrieved and the step of adjusting the pressure within the sealable chamber to facilitate the launch and retrieval.

The invention will now be described by way of example with reference to the accompanying drawings in which:

FIG. 1 shows a parachute arrangement carrying a threading cable and a launch tube for allowing the deployment of the parachute via a slide valve into the pipeline;

FIG. 2 shows the arrangement during the launch of the parachute with the aid of compressed gas;

FIG. 5 shows the stop mechanism prior to insertion into the pipeline; and

FIG. 6 shows the parachute retrieval into the catch tube with the slide valve shut.

Figure 3:
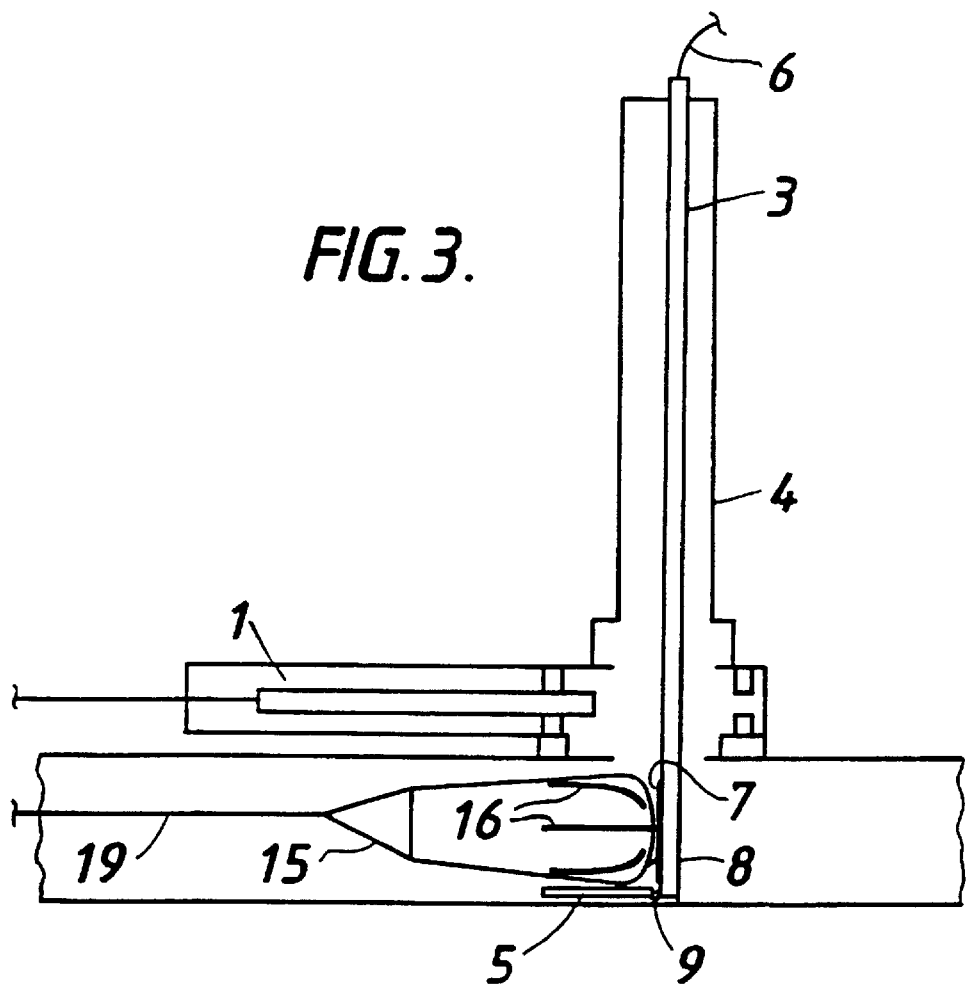
FIG. 3 shows a stop mechanism provided at a downstream location for stopping the parachute at the desired point.

The pipe threading arrangement, typically utilised under live conditions employs previously fitted slide valves at spaced locations over apertures through the pipeline wall using known fitting techniques.

FIG. 1 shows the launcher arrangement which includes a launch body 13 and a parachute tube 12 containing parachute 15. The parachute carries at its front end pieces of adherent material 16 (e.g. Velcro) for reasons described below. At the rear end a threading cable 19 is attached and passes via cable seal 21 to pulley 20 so as to be played out as the parachute moves through the gas pipe after launch. A gas valve 18 allows pressurised gas (e.g. nitrogen) to enter the vertical slide tube 17 for pressure equalisation between the launcher and the gas pipe 2. An equalisation valve 14 allows the pressure in the launch tube following subsequent closure of the slide valve 1 (after launch completion) to be relieved. The slide tube 17 is sealed by seal 22 to prevent leakage between the slide tube and the vertical launch body 13. The launcher is connected to slide valve 1 which is in turn affixed to the gas pipe 2. The slide valve carries an equalisation valve 26. The slide valve can be opened to allow the launch to commence into the gas pipe 2.

As shown in FIG. 2, to launch the device, the equalisation valve 26 into the slide plate 1 is opened to equalise the pressure in the gas pipe and the launch body. When equalised, the slide valve 1 is opened and the vertical slide tube 17 is manually lowered so as to cause the parachute tube to move past the open slide valve 1 towards the pipe 2. Compressed gas via valve 18 then assists in the launch causing the parachute 15 to be blown into the pipe 2 and the gas flowing in the pipeline causes the parachute 15 to inflate and be carried through the pipeline by the flowing gas to a point downstream taking with it the threading cable 19.

At the desired retrieval point downstream a second side valve 1 (see FIG. 3) is located which has already in place a parachute stop mechanism (its deployment described in more detail below).

Figure 4:
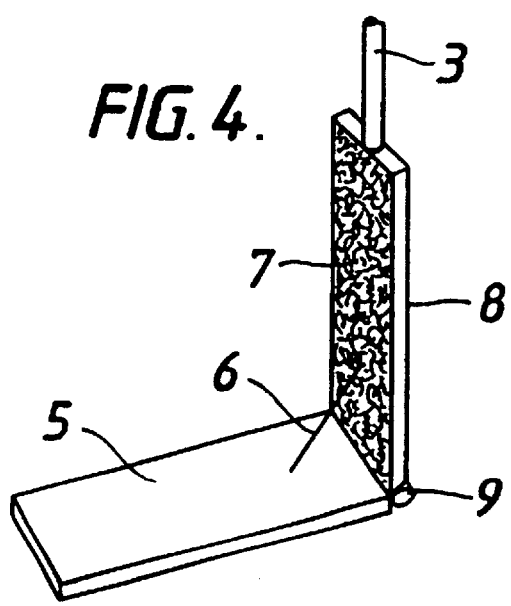
FIG. 4 shows a detail of the stop mechanism with the adherent surface.

The stop mechanism includes a catch arm 8 and a catch finger 5 hinged about pivot 9. The finger is operable from a horizontal to a vertical position by a cable 6 passing through a catch rod 3 (see also FIG. 4). The adherent material 16 on the parachute hits adherent material 7 carried on the stopping face of catch arm 8 and holds the parachute at that point.

The stop mechanism will have been inserted into the pipe 2 with the catch finger in the vertical position as shown in FIG. 5. This is achieved by keeping the cable 6 pulled tight. The catch rod will be sealed around the cable pull to prevent fluid loss. The catch rod 3 is also sealed with the catch body by means of seal 24. The catch rod is lowered into the pipe 2 after valve 1 has been opened. Equalisation valve 10 is provided for similar reasons to that in the launch tube.

Returning to the capture sequence, after the parachute 15 is stopped by vertical catch arm 8, the cable pull 6 is operated to cause the parachute to deflate and become trapped between the arm 8 and finger 5 (see FIG. 6). The vertical catch rod 3 is then raised taking the parachute and trailing cable 19 with it.

After retrieval, the slide valve 1 is closed and the cable is sealed by a mechanism in the valve the subject of a copending patent application. Pressure relief is carried out via valve 10 and the mechanism at the retrieval end removed to allow towing mechanisms to be affixed as appropriate.

What is claimed is:

1. Pipe threading apparatus including launch means for launching a parachute from a first location through the pipe to a second location under fluid pressure; and stopping means for positioning at the second location for stopping the further passage of the parachute, the parachute being configured to carry a cable so as to provide a connection between the first and second locations.

2. Apparatus as claimed in claim 1 wherein the stopping means has an adherent surface for cooperating with an adherent surface carried by the parachute to assist in stopping its travel.

3. Apparatus as claimed in claim 1 wherein the stopping means is movable perpendicular to the axis of the pipe to automatically stop the parachute on contact with the stopping means.

4. Apparatus as claimed in claim 1 wherein the stopping means includes a portion moveable between a vertical and horizontal position to allow deflation and removal of the parachute.

5. Apparatus as claimed in claim 1 wherein the stopping means includes a sealable chamber and valve means for adjusting fluid pressure in the sealable chamber.

6. Apparatus as claimed in claim 1 wherein the launch means includes a sealable chamber and valve means for adjusting fluid pressure in the sealable chamber.

7. Apparatus as claimed in claim 6 wherein fluid supply means are provided connectable to the sealable chamber to allow fluid to pass into the chamber for pressure adjustment and/or launch assistance.

8. Apparatus as claimed in claim 1 including a vertical launch body moveable towards the pipe prior to launch of the parachute.

9. Apparatus as claimed in claim 1 wherein the parachute is configured to be automatically expanded by fluid in the pipe at the initiation of launch.

10. A method of threading a pipe between first and second locations comprising providing an aperture in the pipe at first and second spaced locations, providing a stopping device within the pipe at the second location, launching a parachute carrying a threading cable from the first location allowing the parachute to move to the second location by means of fluid flow through the pipe until stopped by the stopping device and retrieving the parachute with the attached cable to provide pipe threading between the first and second locations.

11. A method as claimed in claim 10 including providing sealable chambers at the first and second locations to allow the device to be launched and retrieved and adjusting the pressure within the sealable chamber to facilitate the launch and retrieval.

12. A method as claimed in claim 10 wherein the stopping device is moved perpendicular to the axis of the pipe into a stopping position.

* * * * *